United States Patent
Özcan et al.

(10) Patent No.: US 10,834,805 B2
(45) Date of Patent: Nov. 10, 2020

(54) DETERMINING A DUTY SCHEDULE FOR A GROUP OF LIGHTING DEVICES PROVIDING A SIMILAR LIGHTING SERVICE

(71) Applicant: SIGNIFY HOLDING B.V., Eindhoven (NL)

(72) Inventors: Evren Özcan, Eindhoven (NL); Jérôme Eduard Maes, Eindhoven (NL); Huon Urbald Ogier Norbert Van De Laarschot, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/617,424

(22) PCT Filed: May 29, 2018

(86) PCT No.: PCT/EP2018/064004
§ 371 (c)(1),
(2) Date: Nov. 26, 2019

(87) PCT Pub. No.: WO2018/219906
PCT Pub. Date: Dec. 6, 2018

(65) Prior Publication Data
US 2020/0146130 A1    May 7, 2020

(30) Foreign Application Priority Data
Jun. 1, 2017  (EP) .................................... 17173917

(51) Int. Cl.
*H05B 47/19* (2020.01)
*H05B 47/17* (2020.01)

(52) U.S. Cl.
CPC ............. *H05B 47/19* (2020.01); *H05B 47/17* (2020.01)

(58) Field of Classification Search
None
See application file for complete search history.

(56) References Cited

U.S. PATENT DOCUMENTS 9,521,635 B1   12/2016   Lambert
9,681,510 B2 *  6/2017   van de Ven ............ H05B 45/00
(Continued)

FOREIGN PATENT DOCUMENTS

| | | |
|---|---|---|
| JP | 201541438 A | 3/2015 |
| WO | 2015125054 A2 | 8/2015 |
| WO | 2016043150 A1 | 3/2016 |

OTHER PUBLICATIONS

Y. Xu, et al., Geography-Informed Energy Conservation for Ad-Hoc Routing, Proceedings of the Seventh Annual ACM/IEEE International Conference on Mobile Computing and Networking, 2001, pp. 70-84.

(Continued)

*Primary Examiner* — Dedei K Hammond
(74) *Attorney, Agent, or Firm* — Akarsh P. Belagodu

(57) ABSTRACT

A lighting device (31) is configured to determine a group of service-providing devices (41-44) and determine a schedule for the service-providing devices in the group. The group (101) comprises at least two service-providing devices capable of performing a similar or a same lighting service. The schedule indicates for each service-providing device of the group in which time period the service-providing device is able to receive messages such that at least one device of the determined group of service-providing devices is able to receive messages. The lighting device is configured to transmit the schedule to the service-providing devices.

13 Claims, 10 Drawing Sheets

(56) References Cited

U.S. PATENT DOCUMENTS

2014/0195842 A1    7/2014  Sreedharan Nair et al.
2015/0348333 A1  12/2015  Ward, III
2016/0135122 A1    5/2016  Abraham et al.
2016/0286574 A1*  9/2016  Abraham ................ H04W 8/00

OTHER PUBLICATIONS

M.A. Matin, et al., "Overiew of Wireless Sensor Network", INTECH, 2012, pp. 1-23.

* cited by examiner

DETERMINING A DUTY SCHEDULE FOR A GROUP OF LIGHTING DEVICES PROVIDING A SIMILAR LIGHTING SERVICE

CROSS-REFERENCE TO PRIOR APPLICATIONS

This application is the U.S. National Phase application under 35 U.S.C. § 371 of International Application No. PCT/EP2018/064004, filed on May 29, 2018, which claims the benefit of European Patent Application No. 17173917.0, filed on Jun. 1, 2017. These applications are hereby incorporated by reference herein.

FIELD OF THE INVENTION

The invention relates to alighting device for enabling energy conservation and a lighting system comprising such alighting device.

The invention further relates to a method for enabling energy conservation in a lighting device.

The invention also relates to a computer program product enabling a processor of a lighting device to perform such a method.

BACKGROUND OF THE INVENTION

The Internet of Things (IoT) provides opportunities for (smart) devices to be connected. The number of devices that communicate with each other will therefore increase. In order to reduce power consumption, such devices will often not be active all the time, but stay in a standby mode most of the time. In this standby mode, the receivers of the IoT devices are normally still listening to signals and become active after being triggered by a signal. The IoT devices that are in standby mode and are listing still consume a certain amount of power. Although this certain amount of power is minor, taken over time, such power consumption will still add up to a significant amount and may still exceed the requirements of certain governments.

International application WO2015125054A2 discloses a method to implement automatic lighting control that can save power, which takes into account user occupancy in a monitored area. Wherein lights in a spatial location near a monitored area can be turned on (after a small time gap, if required), after confirming that a person is staying near that location and is not simply passing by. To this end it is proposed to monitor user activity near that spatial location.

"Geography-informed Energy Conservation for Ad-hoc Routing" by Y. Xu, J. Heidemann and D. Estrin, Proceedings of the Seventh Annual ACM/IEEE International Conference on Mobile Computing and Networking, pages 70-84, 2001, discloses an algorithm that allows nodes to stop listening during certain periods, thereby reducing power consumption. This publication describes an energy-aware location-based routing algorithm designed for mobile ad hoc networks. The network area is first divided into fixed zones and forms a virtual grid. Inside each zone, nodes collaborate with each other to play different roles. A node that is awake is responsible for monitoring and reporting data to the base station on behalf of the nodes in the zone. Hence, energy is conserved by turning off unnecessary nodes in the network without affecting the level of routing fidelity.

A drawback of this energy conservation mechanism is that it only works well if the nodes of a network perform network routing and is not suitable for networks with devices that provide other non-communication services, e.g. a lighting service.

SUMMARY OF THE INVENTION

It is a first object of the invention to provide a lighting device, which enables energy conservation in more lighting service-providing devices.

It is a second object of the invention to provide a method, which enables energy conservation in a lighting device.

In a first aspect of the invention, the electronic device comprises at least one transmitter and at least one processor configured to determine a group of service-providing devices, said group comprising at least two service-providing devices capable of performing a similar or a same service, determine a schedule for said service-providing devices in said group, said schedule indicating for each service-providing device of said group in which time period said service-providing device is able to receive messages such that at least one device of the determined group of service-providing devices is able to receive messages, and use said at least one transmitter to transmit said schedule to said service-providing devices.

The inventors have recognized that one or more other service-providing devices may be used to perform at least part of the service on behalf of a service-providing device that is momentarily not able to receive messages, i.e. not listening, and that determining a schedule for a group of service-providing devices capable of performing a similar or a same service is necessary to realize this in the most energy-efficient manner. An electronic device that determines its own sleep time without any coordination with other devices is not able to achieve the same amount of energy conservation. The invention allows a group of service-providing devices to react immediately (as a group), thereby realizing the service and creating a better user experience.

Said service may comprise a high-level service or application-level service, like lighting, audio or video reproduction, functional lighting, or entertainment lighting, more alternatively the services may include audio or video capture. In case of audio capture this may be enabled using wireless microphones that may be used for voice control, for example for home automation or security purposes. In case of video capture this may use wireless vision sensors for security purposes.

Preferably, said schedule does not permit any time period to exist in which none of said service-providing devices is able to receive messages. This allows the group of service-providing devices to react fastest. In order to achieve energy savings, the schedule should not permit all of said service-providing to be able receive messages all the time. The service-providing devices do not need to be capable of performing the exact same service (e.g. RGB color lighting with the same maximum luminance). Important is that one service-providing device is able to take over the performance of a service on behalf of another service-providing device of the same group. In other words, service-providing devices of the same group are capable of performing interchangeable services. A service-providing device that is able to receive messages is able to receive a command message that causes said service-providing device to provide said same or similar service. Said electronic device may transmit said schedule to said service-providing devices directly or via one or more other devices, e.g. via a bridge. Preferably the service is an application-level service; i.e. a service the is above the network communication level; more preferably a non-communication application service such as a lighting service or an audio or a video reproduction service.

Said at least one processor may be configured to determine said group of service-providing devices by selecting said group of service-providing devices from a set of service-providing devices based on information identifying which services said service-providing devices of said set are capable of providing. The electronic device thereby forms the group itself instead of receiving group information from another device or person that formed the group. The electronic device may receive the information from the service-providing devices themselves or from a bridge, for example. The information identifying which services a service-providing device is capable of providing may identify the type of output the device is capable of generating, e.g. light, white light, colored light, light with 500 lux, dimmable light with maximum 1000 lux, etc. In case of audio reproduction the capabilities may range from tone generation (e.g. for providing feedback to a user), the supported compression formats, or the coverage area. In case of video reproduction similar capabilities may be indicated, such as image resolution and or supported codecs. In case of audio capture capabilities these may include for example device sensitivity, supported frequency ranges, and/or supported codecs. In case of video capture capabilities, such may include image resolution, supported codecs, presence of built in motion sensor, presence of built-in IR light sources.

The information identifying which services a service-providing device is capable of providing may further identify the spatial location of the device and/or the spatial area in which the output of the device is sufficiently perceivable in case of lighting, or audio/video reproduction (i.e. the service-provisioning area). Alternatively, the information may indicate the spatial area in which the device receives input, e.g. in case of e.g. an audio sensor/microphone/ultrasound sensor and/or camera or video sensor.

Said at least one processor may be configured to determine said group of service-providing devices by selecting said group of service-providing devices from a set of service-providing devices based on spatial locations of said service-providing devices of said set. Service-providing devices are preferably near each other in order to take over the performance of a service for each other.

Said at least one processor may be configured to determine the durations of said time periods of said schedule based on at least one of: energy consumption of said service-providing devices, spatial locations of said service-providing devices, spatial service-provisioning areas of said service-providing devices, usage of said service-providing devices, time required by said service-providing devices to enter and/or leave a standby mode, and identifiers of services provided by said service-providing devices. For example, the service-providing device whose receiver has the highest power consumption in standby mode may be allocated a shorter time period and the service-providing device whose spatial location or service-provision area is most centrally located may be allocated a longer time period. Furthermore, the duration of a time period may be longer (and time periods may overlap) if the service-providing device allocated to the subsequent time period requires longer to leave a standby mode and/or if the service-providing device allocated to the preceding time period takes longer to enter a standby mode, for example.

Said electronic device may further comprise a user interface and said at least one processor may be configured to use said user interface to provide said schedule to a user and allow said user to adapt said schedule. This allows expert users, e.g. a person who installed the service-providing devices, to modify the schedule based on their expert knowledge.

Said electronic device may further comprise at least one receiver and said at least one processor may be configured to use said at least one receiver to receive a command message addressed to at least a first service-providing device of said group, said command message commanding at least said first service-providing device to perform a specified service at a specified service level, determine a service level in dependence on said specified service level, and cause a second service-providing device of said group to start performing a service similar to or the same as said specified service at said determined service level upon receipt of said command message.

The electronic device may be the second service-providing device or may instruct the second service-providing device, e.g. if the electronic device is a bridge. The second service-providing device performs the requested service to at least a certain degree on behalf of the first service-providing device. The command message may be addressed to the group or to only the first service-providing device, for example. Said at least one processor may be configured to cause said second service-providing device to stop performing said service at a current service level at a moment which depends on a start of said time period in which said first service-providing device is able to receive messages as specified in said schedule.

Said at least one processor may be configured to use said at least one transmitter to transmit said command message to said first service-providing device at a moment which depends on a start of said time period in which said first service-providing device is able to receive messages as specified in said schedule. In this way, the electronic device ensures that the first service-providing device receives the command message. In an alternative embodiment, the source of the command message may retransmit the command message to the first service-providing device or another device, e.g. a bridge if the electronic device is the second service-providing device, may ensure that the first service-providing device receives the command message. The original command message may be forwarded without changes or a new command message may be transmitted whose content is based on the original command message, for example.

Said at least one processor may be configured to, when said group further comprises at least a third service-providing device and said time period in which said third service-providing device is able to receive messages as specified in said schedule is sooner than a time period in which any other service-providing device of said group is able to receive messages as specified in said schedule, determine a further service level in dependence on said specified service level and cause said second service-providing device to stop performing said service at said determined service level and start performing said service at said determined further service level at a moment which depends on a start of said time period in which said third service-providing device is able to receive messages as specified in said schedule. In other words, the service level at which the second service-providing device performs the service is adapted as soon a third service-providing device is also able to take over the performance the service from the first service-providing device. For example, when a group of three lights is commanded to illuminate at 1200 lux, the first light to receive the command message may start illuminating at 1200 lux when it receives the command message and it needs to take over the performance of the service from the other two lights, at 600 lux when the second light to receive the command message is also able to take over the performance of the service from the third light to receive the command message and at 300 lux when it is no longer necessary to perform the service on behalf of any of the other lights. This results in the service being initially performed to at least a certain degree and gradually being performed completely per the user's expectations.

Said at least one processor may be configured to, when said group further comprises at least a third service-providing device and said time period in which said first service-providing device is able to receive messages as specified in said schedule is later than a time period in which any other service-providing device of said group is able to receive messages as specified in said schedule, cause said second service-providing device to stop performing said service at said determined service level at a moment which depends on a start of said time period in which said first service-providing device is able to receive messages as specified in said schedule. In other words, the second service-providing device is the only device to perform the service on behalf of the first service-providing device. For example, when a group of three lights is commanded to illuminate at 1200 lux, the first light to receive the command message may start illuminating at 1200 lux when it receives the command message and it needs to take over the performance of the service from the other two lights and at 300 lux when the other two lights have also received the command message and it is no longer necessary to perform the service on behalf of any of the other lights. This results in the service being initially performed to at least a certain degree and no intermediate adaptations of the provided service level being made until the service can be performed completely per the user's expectations.

Said at least one processor may be configured to, when said command message is addressed to only said first service-providing device, cause said second service-providing device to stop performing said service at a moment which depends on a start of said time period in which said first service-providing device is able to receive messages as specified in said schedule. Thus, if the command message is addressed to only the first service-providing device, the second service-providing device no longer has to take over the performance of the service for the first service-providing device and stops performing the service. If the command message would have been addressed to the group, the second service-providing device would preferably not stop performing the service at this moment, but it may start performing the service at a different service level (e.g. 50% illumination instead of 100% illumination), because it no longer has to take over the performance of the service for the first service-providing device at this moment.

It will be clear to those skilled in the art that the above example for illumination may also be used in a similar manner for devices that reproduce audio; in case a group of three audio reproduction devices is commanded to generate sound at a certain volume level, the first audio reproduction device to receive the command message may start producing sound at a higher volume level to compensate for the fact that it is the sole device doing so, it may subsequently reduce the audio volume proportionally when further audio reproduction devices start participating in providing the service. Likewise, an audio capture service may be provided using a number of microphones located in a spatial region, wherein the sensitivity of the individual microphones is tuned to provide a basic service level, which might give rise to a significantly higher noise floor on account of the higher sensitivity. However, when more microphones out of the group come available, the sensitivity per microphone may be adapted so as to reduce the noise-floor and provide the user expected service level.

In a second aspect of the invention, the system comprises said electronic device of the invention and a further electronic device, said further electronic device comprising at least one receiver and at least one processor configured to use said at least one receiver to receive said schedule from said electronic device, use said at least one receiver to receive a command message addressed to at least a first service-providing device of said group, said command message commanding at least said first service-providing device to perform a specified service at a specified service level, determine a service level in dependence on said specified service level, and cause a second service-providing device of said group to start performing a service similar to or the same as said specified service at said determined service level upon receipt of said command message.

Thus, the electronic device determines the schedule, but does not use or is not the only device that uses the schedule to determine whether to take over the performance of a service for an(other) service-providing device. The electronic device may be a mobile device and the further electronic device may be a bridge or a service-providing device, for example. Alternatively, the electronic device may be a bridge and the further electronic device may be a service-providing device, for example. Alternatively, the electronic device may be the second service-providing device and the further electronic device may be the first service-providing device, for example.

In a third aspect of the invention, the method comprises determining a group of service-providing devices, said group comprising at least two service-providing devices capable of performing a similar or a same service, determining a schedule for said service-providing devices in said group, said schedule indicating for each service-providing device of said group in which time period said service-providing device is able to receive messages such that at least one device of the determined group of service-providing devices, and transmitting said schedule to said service-providing devices. The method may be implemented in hardware and/or software.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: determining a group of service-providing devices, said group comprising at least two service-providing devices capable of performing a similar or a same service, determining a schedule for said service-providing devices in said group, said schedule indicating for each service-providing device of said group in which time period said service-providing device is able to receive messages such that at least one device of the determined group of service-providing devices, and transmitting said schedule to said service-providing devices.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
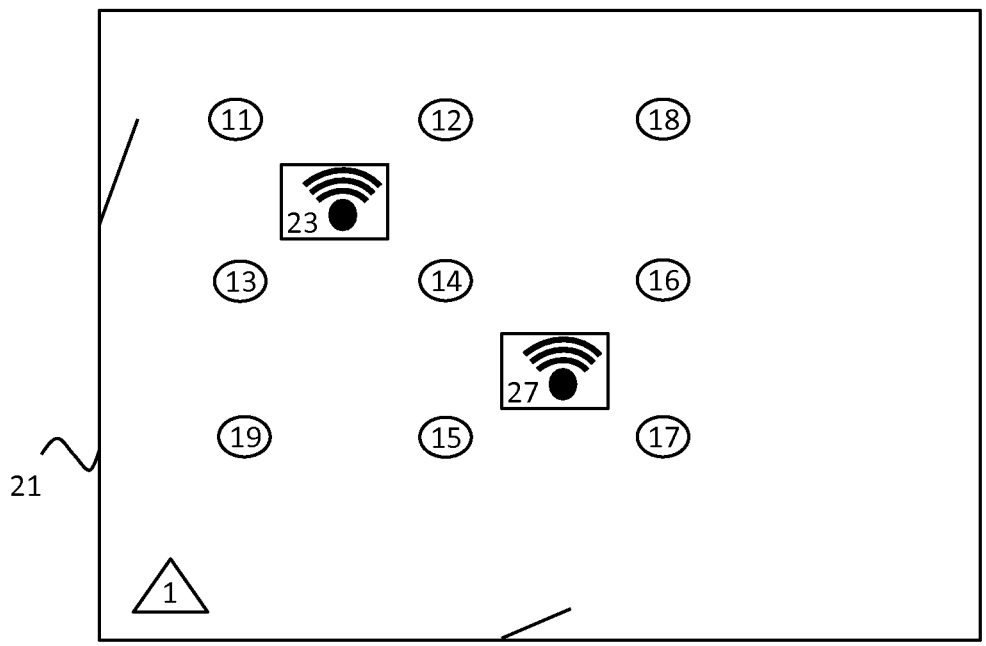
FIG. 1 shows a first embodiment of a system which comprises the electronic device of the invention.

FIG. 1 shows a first embodiment of a system which comprises the electronic device of the invention and an example of an environment in which the invention may be used: a room 21 with two doors, a bridge 1, two sensor devices 23 and 27, and nine service-providing devices: lights 11 to 19. In the embodiment of FIG. 1, the two sensor devices 23 and 27 are separate from the lights 11 to 19. In an alternative embodiment, one or both sensor devices may be integrated into one or more of lights 11 to 19. An embodiment of the bridge 1 is shown in more detail in FIG. 2. In this embodiment, the bridge 1 comprises a transceiver 3 and a processor 5. The processor 5 is configured to determine a group of service-providing devices. The group comprises at least two service-providing devices capable of performing a similar or a same service (and therefore an interchangeable service). In this embodiment, the group is manually configured by a person installing or commissioning the system. In an alternative embodiment, the group is automatically determined by the bridge 1, e.g. based on a model or category of the lights 11 to 19 and/or based on patterns in usage of the lights 11 to 19. Automatic determination of groups may be rule-based, for example.

The processor 5 is further configured to determine a schedule for the service-providing devices in the group. The schedule indicates for each service-providing device of the group in which time period the service-providing device is able to receive messages such that at least one device of the determined group of service-providing devices is able to receive messages and can thus be called a duty schedule. The processor 5 is also configured to use the transceiver 3 to transmit the schedule to the service-providing devices of the group. In this embodiment, the service-providing devices are lights, but in an alternative embodiment, some or all of the service-providing devices might provide additional or different services, e.g. the reproduction of audio. The schedule may specify a duration in the order of hundreds of milliseconds or in the order of seconds, for example, after which it is repeated for a much longer time, e.g. hours, days or months. The minimum duration of the schedule preferably depends on the time it takes service-providing devices to leave the standby mode (i.e. to start listening) and to enter the standby mode, which is normally in the order of milliseconds. This prevents that the duration of the schedule and therefore the time periods allocated to the service-providing devices is so short that it reduces the energy efficiency of the schedule.

Figure 2:
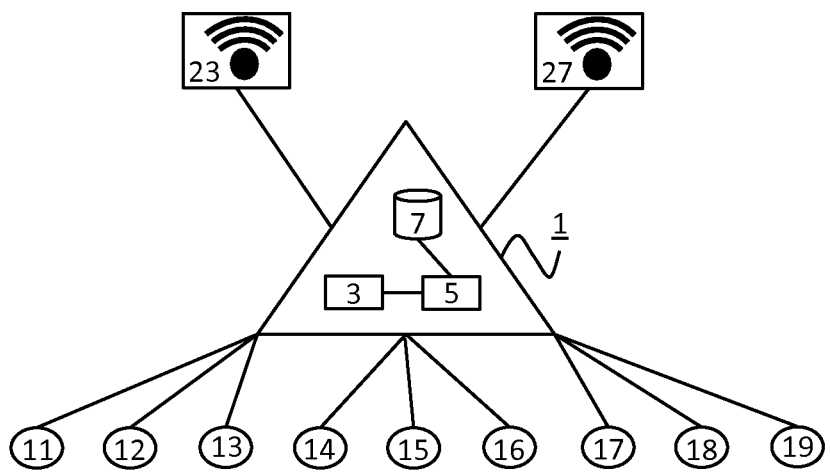
FIG. 2 is a block diagram of a first embodiment of the electronic device of the invention.

The lights 11 to 19 are controllable via the bridge 1. The bridge 1 may be connected to the lights 11 to 19 via wire and/or wireless. The bridge 1 may be a Philips Hue bridge, for example. The bridge 1 may be connected to the Internet, e.g. via a wireless LAN access point. In the embodiment of FIG. 2, the sensor devices 23 and 27 are connected directly to the bridge 1. The sensor device 23 comprises a motion sensor configured to detect someone in the room 21 near the left door. The sensor device 27 comprises a motion sensor configured to detect someone in the room 21 near the front door. The bridge 1 may communicate with the lights 11 to 19 and with the sensor devices 23 and 27 using ZigBee or a protocol based on ZigBee, for example.

In the embodiment of the bridge 1 shown in FIG. 2, the bridge 1 comprises one processor 5. In an alternative embodiment, the bridge 1 comprises multiple processors. The processor 5 of the bridge 1 may be a general-purpose processor, e.g. from ARM or Qualcomm, or an application-specific processor. The processor 5 of the bridge 1 may run a Linux operating system for example. In the embodiment shown in FIG. 2, a receiver and a transmitter have been combined into a transceiver 3. In an alternative embodiment, one or more separate receiver components and one or more separate transmitter components are used. In an alternative embodiment, multiple transceivers are used instead of a single transceiver. The transceiver 3 may use one or more wireless communication technologies to transmit and receive data, e.g. LTE, Wi-Fi, ZigBee, Thread, 802.15.4, Bluetooth and/or BLE. In the embodiment shown in FIG. 2, the mobile device 1 further comprises storage means 7, e.g. for storing information identifying lights 11 to 19 and their capabilities and for storing the schedule. The storage means 7 may comprise one or more memory units. The storage means 7 may comprise solid state memory, for example.

In this embodiment, the processor 5 is configured to use the transceiver 3 to receive a command message addressed to at least a first service-providing device, e.g. light 11, of the group. The command message commands at least the first service-providing device to perform a specified service at a specified service level. The processor is further configured to determine a service level in dependence on the specified service level and cause a second service-providing device, e.g. light 12, of the group to start performing a service similar to or the same as the specified service at the determined service level upon receipt of the command message.

In this embodiment, the processor 5 is configured to use the transceiver 3 to transmit the command message to the first service-providing device at a moment which depends on a start of the time period in which the first service-providing device is able to receive messages as specified in the schedule. In this embodiment, the processor 5 is configured to cause the second service-providing device, by transmitting a command message, to stop performing the service at a current service level at a moment which depends on a start of the time period in which the first service-providing device is able to receive messages as specified in the schedule. Thus, the lights 11 to 19 do not even need to be aware of the schedule, as the bridge 1 transmits commands to the lights 11 to 19 at the appropriate moments.

In this embodiment, the command message may be addressed to either a group of lights or to individual lights. In alternative embodiments, it is only possible to address the command message to a group or it is only possible to address the command message to individual service-providing devices. The processor 5 is configured to, if the command message is addressed to only the first service-providing device, cause the second service-providing device to stop performing the service at a moment which depends on a start of the time period in which the first service-providing device is able to receive messages as specified in the schedule.

If the group comprises at least a third service-providing device (i.e. at least three service-providing devices), command messages addressed to the group may be handled in one of at least the following two ways:

The service level at which the second service-providing device performs the service is adapted as soon a third service-providing device is also able to take over the performance of the service from the first service-providing device.

In case the third service-providing device is the device which is able to receive messages in a time period which is sooner than a time period in which any other service-providing device of the group is able to receive messages, the processor 5 is configured to determine a further service level in dependence on the specified service level and cause the second service-providing device to stop performing the service at the determined service level and start performing the service at the determined further service level at a moment which depends on a start of the time period in which the third service-providing device is able to receive messages as specified in the schedule.

As a first example, the first light to receive the command message turns to 100% illumination level. When a second light has received the command message, they both turn to 75% illumination level. When the third and final light of the group has received the command message, they all turn to the commanded 50% illumination level. Thus, the illumination level of the first light gradually decreases, while the total illumination level gradually increases. Alternatively, the illumination level of the individual lights might also gradually increase. As a second example, the first light to receive the command message turns to 50% illumination level. When a second light has received the command message, they both turn to 65% illumination level. When the third and final light of the group has received the command message, they all turn to the commanded 80% illumination level.

The second service-providing device is the only device to perform the service on behalf of the first service-providing device.

In case the first service-providing device is the device which is able to receive messages in a time period which is later than a time period in which any other service-providing device of the group is able to receive messages, the processor 5 is configured to cause the second service-providing device to stop performing the service at the determined service level at a moment which depends on a start of the time period in which the first service-providing device is able to receive messages as specified in the schedule.

As a first example, the first light to receive the command message turns to 100% illumination level. When the other lights have received the command message, all the lights that have received the command message go to the commanded 80% illumination level. As a second example, the first light to receive the command message turns to white (as this light can only do white). When the other lights have received the command message, the commanded light scene is set (this scene might not even use the light that turned on first).

Figure 3:
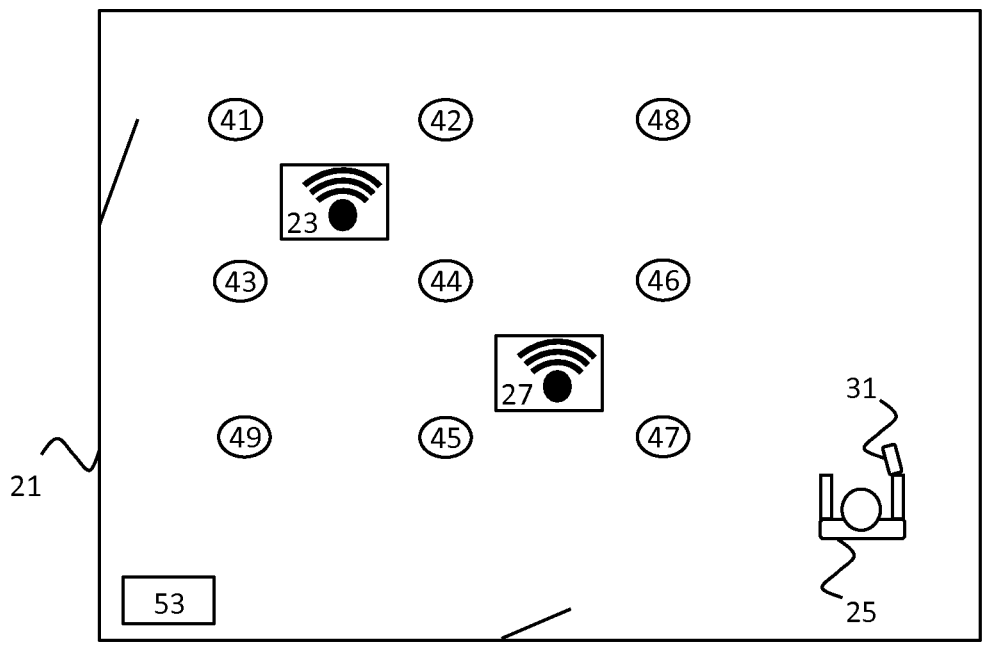
FIG. 3 shows a second embodiment of a system which comprises the electronic device of the invention.

FIG. 3 shows a second embodiment of a system which comprises the electronic device of the invention. In the embodiment shown FIG. 3, it is the mobile device 31 held by person 25 which determines the schedule. No bridge is used in this example. The mobile device 31 and the sensor devices 23 and 27 communicate with the lights 41 to 49 via a data forwarding device 53. The data forwarding device 53 is not aware of the schedule. Unlike lights 11 to 19 of FIG. 1, lights 41 to 49 are aware of the schedule. The mobile device 31 transmits the schedule to lights 41 to 49.

Lights 41 to 49 each comprise at least one receiver and at least one processor. This at least one processor is configured to use this at least one receiver to receive the schedule from the mobile device 31, use this at least one receiver to receive a command message addressed to at least a first service-providing device of the group (i.e. addressed to another one of the lights 41 to 49 or to a group comprising another one of the lights 41 to 49), the command message commanding at least this first service-providing device to perform a specified service at a specified service level, determine a service level in dependence on the specified service level, and start performing a service similar to or the same as the specified service at the determined service level upon receipt of the command message.

In this embodiment, each of the lights 41 to 49 is configured to take over performance of the service on behalf of another one of the lights in the same group if it determines that the command message is addressed to a light in the same group that is, according to the schedule, not able to receive messages. Furthermore, each of the lights 41 to 49 buffers messages addressed to other service-providing devices in the same group that are, according to the schedule, currently not able to receive these messages and forwards these messages to them as soon as they are.

The lights 41 to 49 may determine the current time based on an external signal which indicates the current time, e.g. received over an AC power signal, or by using an internal clock. In order to prevent clock drift, the internal clocks of lights of the same group would need to be synchronized regularly. These clocks may synchronize, for example, by using an atomic clock, e.g. by contacting an Internet (NTP) server or by using a radio-controlled clock, or by using the same clock (which might or might not be accurate). In order to implement the latter, a light may transmit a synchronization message to other lights in the overlap periods between the time periods in which lights are able to receive messages. When determining the schedule, an (additional) overlap period between time periods may be scheduled in dependence on the accuracy of the time synchronization, e.g. if the time synchronization is not very accurate.

Figure 4:
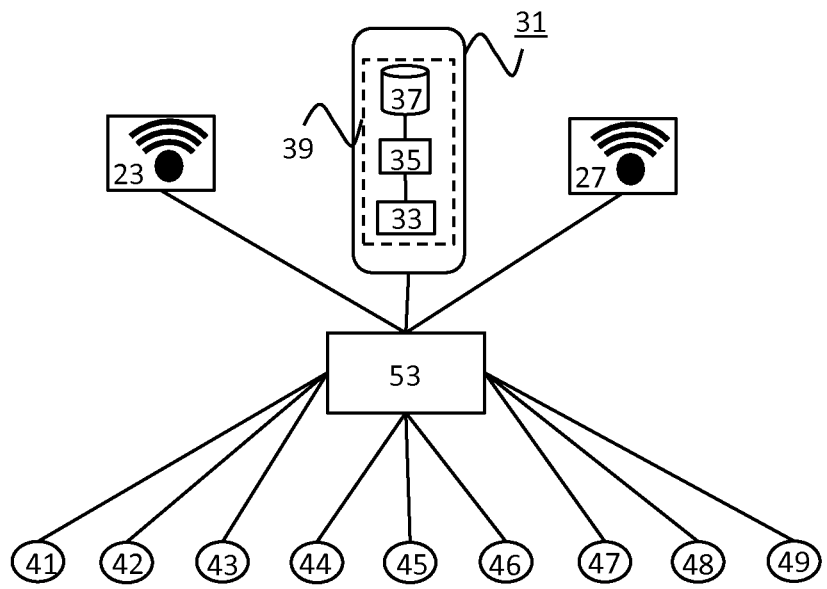
FIG. 4 is a block diagram of a second embodiment of the electronic device of the invention and of an embodiment of the system of the invention.

An embodiment of the mobile device 31 is shown in more detail in FIG. 4. In this embodiment, the mobile device 31 comprises a transceiver 33 and a processor 35. The processor 35 is configured to determine a group of service-providing devices. The group comprises at least two service-providing devices capable of performing a similar or a same service. The processor 35 is further configured to determine a schedule for the service-providing devices in the group. The schedule indicates for each service-providing device of the group in which time period the service-providing device is able to receive messages such that at least one device of the determined group of service-providing devices is able to receive messages. The processor 35 is also configured to use the transceiver 33 to transmit the schedule to the service-providing devices of the group.

The mobile device 31 further comprises a touchscreen 39 which forms a user interface. The processor 35 is configured to use the touch screen 39 to provide the schedule to a user and allow the user to adapt the schedule. In an alternative embodiment, the user interface does not comprise a touchscreen, e.g. the user interface uses speech synthesis and recognition or is formed by the combination of a non-touchscreen display and physical keys. The data forwarding device 53 may comprises a Wi-Fi access point and/or a network (e.g. Ethernet) switch, for example.

In the embodiment of the mobile device 31 shown in FIG. 4, the mobile device 31 comprises one processor 35. In an alternative embodiment, the mobile device 31 comprises multiple processors. The processor 35 of the mobile device 31 may be a general-purpose processor, e.g. from ARM or Qualcomm, or an application-specific processor. The processor 35 of the mobile device 31 may run an iOS, Windows or Android operating system for example. The invention may be implemented using a computer program running on one or more processors.

In the embodiment shown in FIG. 4, a receiver and a transmitter have been combined into a transceiver 33. In an alternative embodiment, one or more separate receiver components and one or more separate transmitter components are used. In an alternative embodiment, multiple transceivers are used instead of a single transceiver. The transceiver 33 may use one or more wireless communication technologies to transmit and receive data, e.g. LTE, Wi-Fi, ZigBee, Thread, 802.15.4, Bluetooth and/or BLE. In the embodiment shown in FIG. 4, the mobile device 31 further comprises storage means 37, e.g. for storing the schedule, apps and app data. The storage means 37 may comprise one or more memory units. The storage means 37 may comprise solid state memory, for example. The touchscreen 39 may comprise an LCD or OLED display panel, for example.

Figure 5:
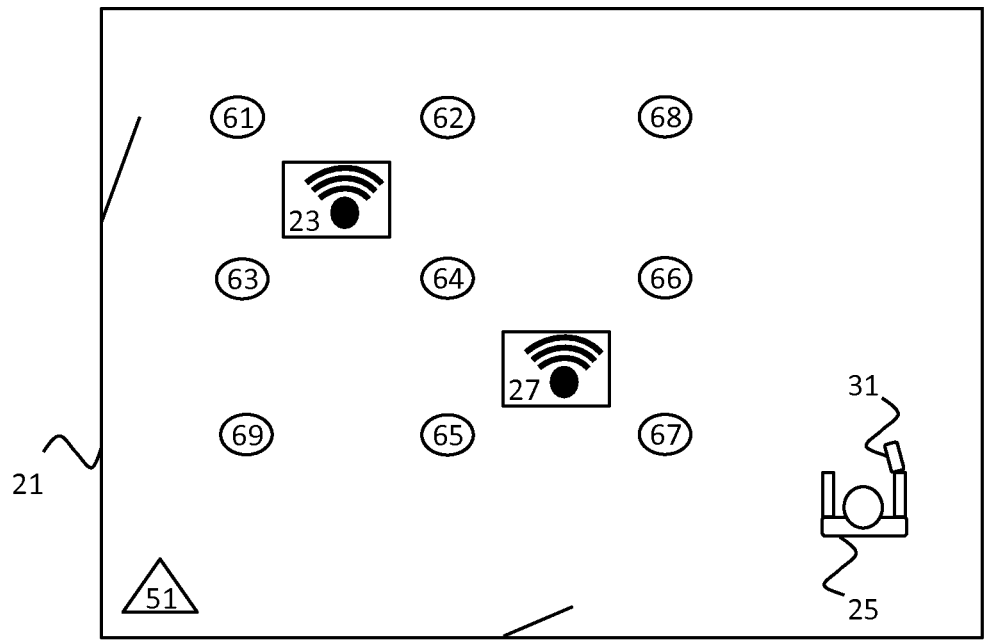
FIG. 5 shows a third embodiment of a system which comprises the electronic device of the invention

FIG. 5 shows a third embodiment of a system which comprises the electronic device of the invention. In this third embodiment, the same mobile device 31 is used as in FIG. 3. However, instead of a data forwarding device 53, a bridge 51 is present. Bridge 51 does not determine the schedule like bridge 1 of FIG. 1, but it does buffer messages addressed to service-providing devices (lights 61 to 69) that are, according to the schedule, currently not able to receive these messages and forwards these messages as soon as they are. In this embodiment, the bridge 51 starts transmitting the command message as soon as the applicable service-providing device is able to receive messages according to the schedule. In an alternative embodiment, the applicable service-providing device polls the bridge 51 as soon as it is able to receive messages and the bridge 51 transmits the command message as soon as it has received the polling request.

Bridge 51 also maintains a list of service-providing devices connected to the bridge it and their capabilities and transmits it to the mobile device 31 so that the mobile device 31 is able to form the group(s) based on this information. In an alternative embodiment, bridge 51 forms the group(s) and transmits information about the group(s) and the devices in the group(s) to the mobile device 31. The lights 61 to 69 are smarter than the lights 11 to 19 of FIG. 1 and they decide based on the received command message and the schedule whether to take over the performance of a service on behalf of another service-providing device in the same group, as described in relation to FIG. 3. However, unlike the lights 41 to 49 of FIG. 3, the lights 61 to 69 of FIG. 5 do not buffer and forward received command messages to other devices.

Figure 6:
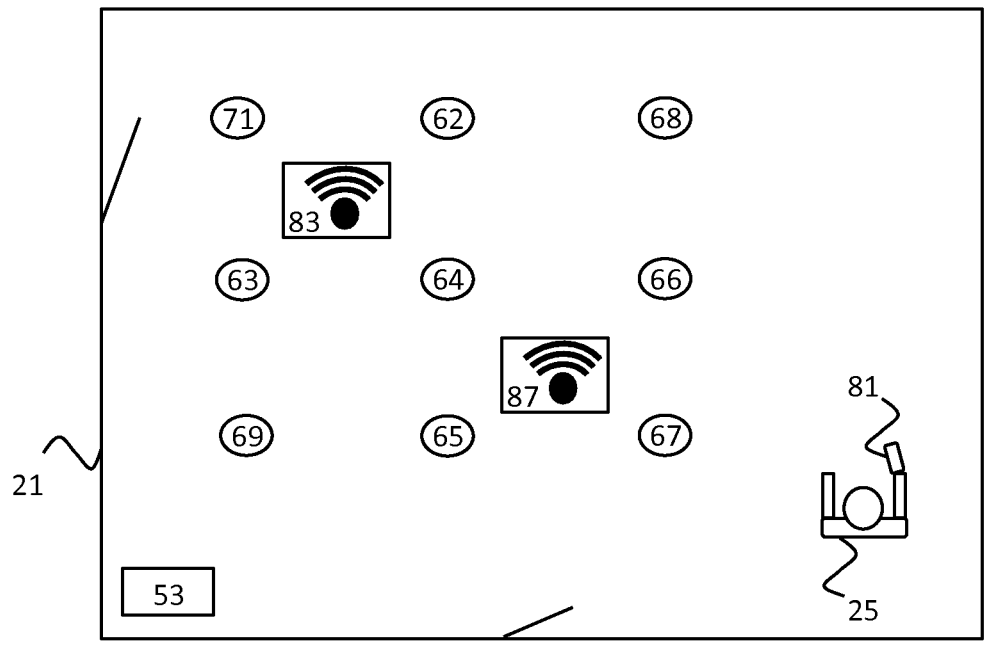
FIG. 6 shows a fourth embodiment of a system which comprises the electronic device of the invention.

FIG. 6 shows a fourth embodiment of a system which comprises the electronic device of the invention. In this fourth embodiment, it is one of the service-providing devices that determines the schedule: light 71. The other lights 62 to 69 are the same lights 62 to 69 that are shown in FIG. 5. The mobile device 81 can be used to transmit command messages to lights 71 and 62 to 69, but it does not determine the schedule. For example, the mobile device 81 may provide a user interface that allows a user to turn on or off one or more of lights 71 to 79 and/or to set the color and/or intensity of these lights. The light 71 may be in standby mode periodically and determine the schedule when it is not in standby mode. In the embodiment of FIG. 6, only one of lights 71 and 62 to 69, i.e. light 71, determines the schedule. In an alternative embodiment, multiple of the lights determines the schedule, e.g. the master of each group.

In this embodiment, the lights 71 and 62 to 69 buffer and forward received command messages to other devices. In an alternative embodiment, the mobile device 81 and the sensor devices 23 and 27 first receive the schedule from light 71 and only transmit a command message to one of the lights 71 and 62 to 69 when it is able to receive messages according to the schedule. In another alternative embodiment, the mobile device 81 and the sensor devices 23 and 27 are not aware of the schedule, but are able to determine whether a command message has been successfully delivered to its destination, e.g. to one or more of lights 71 and 62 to 69, and retransmit the command messages one or more times until it has been successfully delivered to its destination.

Figure 7:
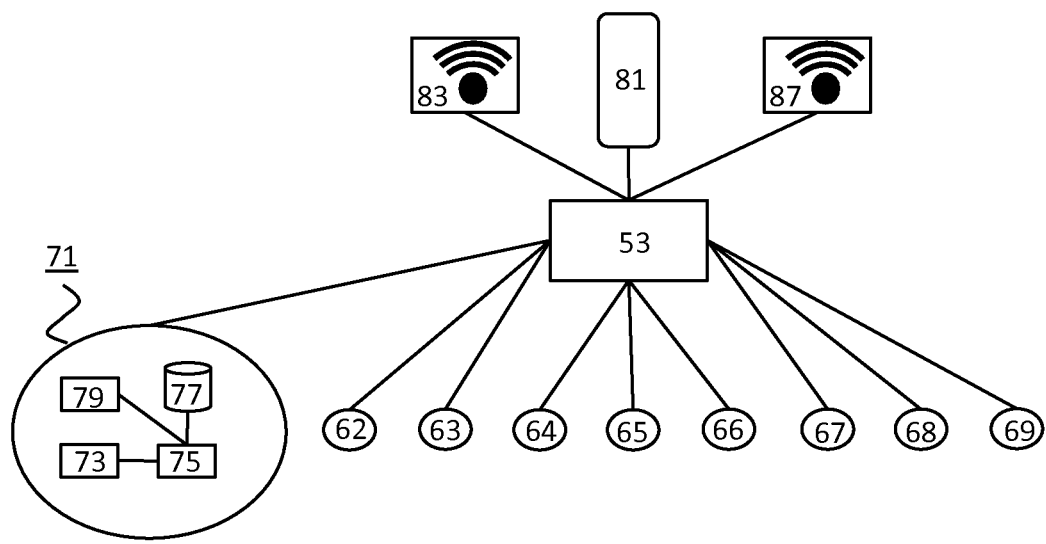
FIG. 7 is a block diagram of a third embodiment of the electronic device of the invention.

An embodiment of the light 71 is shown in more detail in FIG. 7. In this embodiment, the light 71 comprises a transceiver 73 and a processor 75. The processor 75 is configured to determine a group of service-providing devices. The group comprises at least two service-providing devices capable of performing a similar or a same service. The processor 75 is further configured to determine a schedule for the service-providing devices in the group. The schedule indicates for each service-providing device of the group in which time period the service-providing device is able to receive messages such that at least one device of the determined group of service-providing devices is able to receive messages. The processor 75 is also configured to use the transceiver 73 to transmit the schedule to the service-providing devices of the group.

In the embodiment of the light 71 shown in FIG. 7, the light 71 comprises one processor 75. In an alternative embodiment, the light 71 comprises multiple processors. The processor 75 of the light 71 may be a general-purpose processor or an application-specific processor. The processor 75 of the light 71 may run a Linux operating system for example. The light 71 further comprises an illumination unit 79, e.g. comprising one or more LED chips.

In the embodiment shown in FIG. 7, a receiver and a transmitter have been combined into a transceiver 73. In an alternative embodiment, one or more separate receiver components and one or more separate transmitter components are used. In an alternative embodiment, multiple transceivers are used instead of a single transceiver. The transceiver 73 may use one or more wired or wireless communication technologies to transmit and receive data, e.g. Ethernet, LTE, Wi-Fi, ZigBee, Thread, 802.15.4, Bluetooth and/or BLE. In the embodiment shown in FIG. 7, the light 71 further comprises storage means 77, e.g. for storing the schedule and current control light settings (e.g. color and/or luminance) of the illumination unit 79. The storage means 77 may comprise one or more memory units. The storage means 77 may comprise solid state memory, for example.

Figure 8:
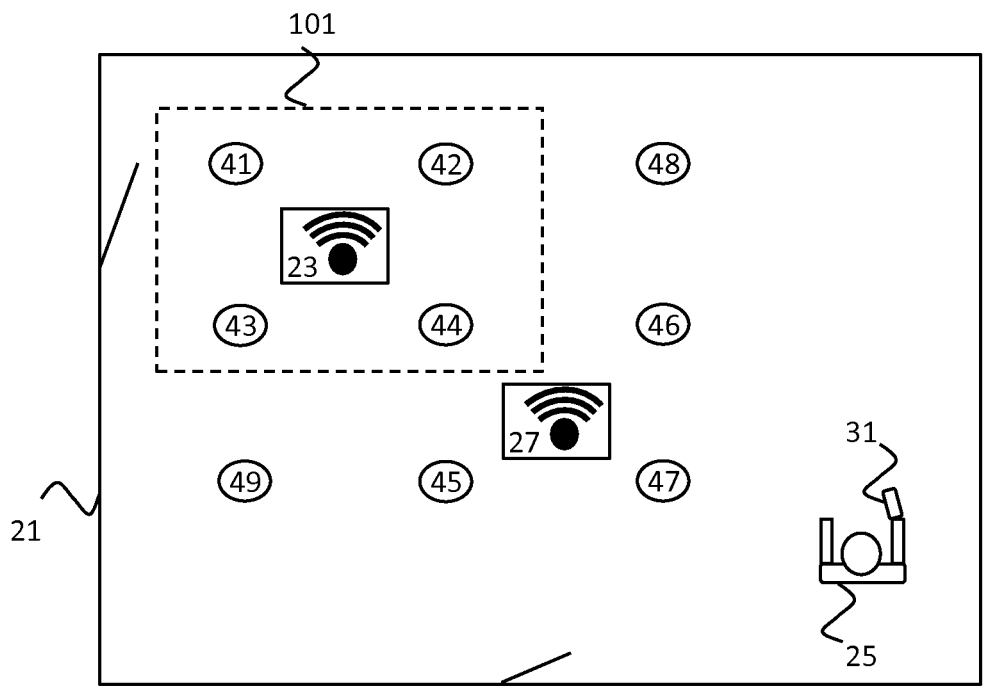
FIG. 8 illustrates an example of a grouping with one group in the system of FIG. 3.

An example of a grouping with a first group 101 is shown in FIG. 8. Group 101 comprises lights 41 to 44 of FIG. 3. Sensor device 23 is configured to transmit a command message to the group 101 when it detects someone near the left door of room 21. Lights 41 to 44 provide a similar service, as they are all lights and they all illuminate the area near the left door of room 21. In this embodiment, the processor of mobile device 31 is configured to determine the group of service-providing devices by selecting the group of service-providing devices from a set of service-providing devices based on information identifying which services the service-providing devices of the set are capable of providing and this information includes spatial locations of the service-providing devices of the set.

Figure 9:
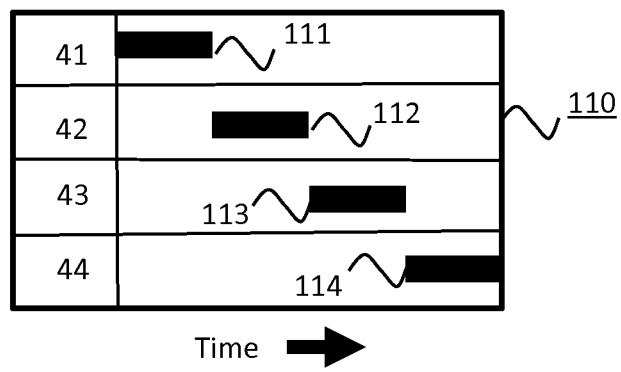
FIG. 9 depicts a first example of a schedule for the grouping of FIG. 8.

A first example of a schedule determined for first group 101 is depicted in FIG. 9. In schedule 110, each of the lights 41 to 44 has an allocated time period of equal duration: time period 111 has been allocated to light 41, time period 112 has been allocated to light 42, time period 113 has been allocated to light 43 and time period 114 has been allocated to light 44.

Supposing a time interval of 4 seconds, the light 41 will only listen for command messages in the first second, the light 42 in the period between the first and second second, the light 43 in the period between the second and third second, and the light 44 in the period between the third and fourth second. Each device will reduce power consumption by 75%. Since the four lights 41 to 44 are in the same group and perform a service on behalf of each other, whenever a command message is provided in the room for activating one of the lights in the group, at least one light will immediately react and become active (i.e. perform the service). This light may subsequently activate the other lights by forwarding the command message.

It is sometimes advantageous to allocate longer time periods to some devices and shorter time periods to other devices. For example, the processor of the mobile device 31 may be configured to determine the durations of the time periods of the schedule based on at least one of: energy consumption of the service-providing devices, spatial locations of the service-providing devices, spatial service-provisioning areas of the service-providing devices, usage of the service-providing devices, time required by the service-providing devices to enter and/or leave a standby mode, and identifiers of services provided by the service-providing devices.

End nodes in a mesh network may be allocated a smaller share of the schedule (e.g. a smaller amount of time periods and/or shorter time periods) than nodes that are located centrally in the mesh network, for example. Less efficient devices (e.g. 400 mW standby) may be allocated a smaller share of the schedule than more efficient devices (e.g. 100 mW standby), for example. A device with a longer start-up time may be allocated a smaller number of time periods, for example. If a user uses one device more often than another (as determined from historical data), this device may be allocated a larger share of the schedule, for example. A spatially central device may be allocated a larger share of the schedule than a spatially peripheral device, for example.

Figure 10:
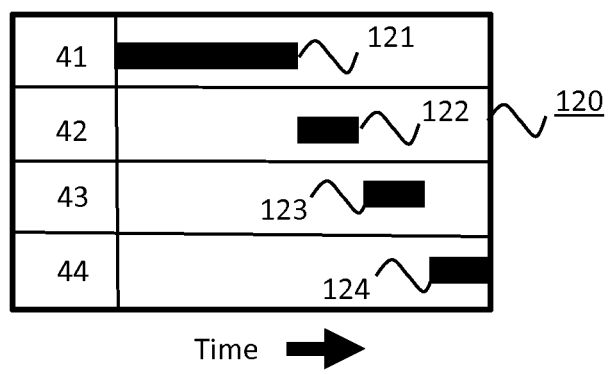
FIG. 10 depicts a second example of a schedule for the grouping of FIG. 8.

A second example of a schedule determined for first group 101 is depicted in FIG. 10. In schedule 120, a longer time period 121 has been allocated to light 41 and shorter time periods have been allocated to lights 42 to 44. Time periods 122 to 124 allocated to lights 42 to 44, respectively, all have the same duration in this example. In this example, the schedule has been determined based on the energy efficiency of the lights 41 to 44. Light 41 is most efficient, so half of the listening time is allocated to light 41. The other lights 42 to 44 share the other half of the listening time. In general, a hierarchy of service-providing devices may first be established, e.g. based on the energy efficiency or service performance of the devices, and this hierarchy may be used subsequently to determine the allocation of the time periods in the schedule. A mathematical function may be applied to allocate these time periods, wherein the first device in the hierarchy is allocated a larger time period than the successive devices in said hierarchy, etc. For example, when having four devices in a hierarchy ordered 1 to 4, a quadratic function may determine that the first device may occupy $16/23$ share of the total schedule, the second $4/23$, the third $2/23$ and the fourth $1/23$. Similarly, a linear, a polynomial or logaritmic function may be applied. In an extreme case, time period 121 might even occupy 99% of the total schedule, while time periods 122 to 124 only occupy 1% of the total schedule combined.

Figure 11:
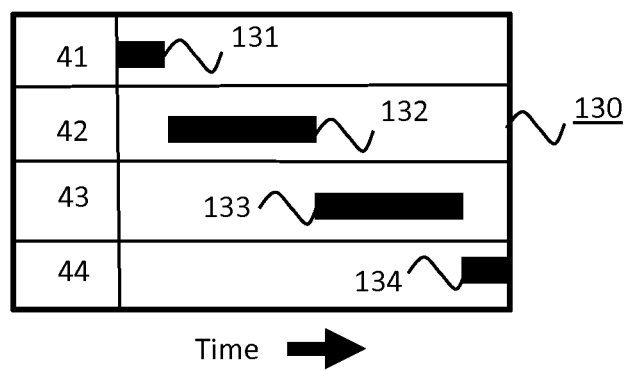
FIG. 11 depicts a third example of a schedule for the grouping of FIG. 8.

A third example of a schedule determined for first group 101 is depicted in FIG. 11. In schedule 130, longer time periods 132 and 133 have been allocated to lights 42 and 43, respectively, and shorter time periods 131 and 134 have been allocated to lights 41 and 44, respectively. In this example, the schedule 130 has been determined based on the identifiers of the services, i.e. the capabilities, of the lights 41 to 44. Lights 42 and 43 have the most capabilities, e.g. supporting the highest lumen output or supporting color instead of white only, so most listening time is allocated to lights 42 and 43 and the remaining listening time is allocated equally to lights 41 and 44.

Figure 12:
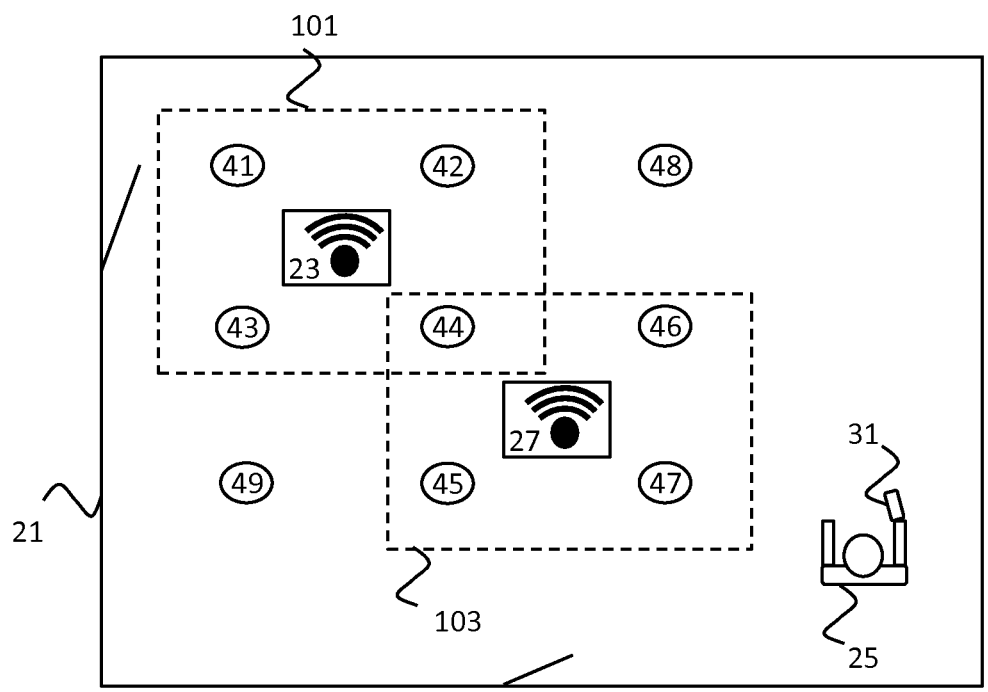
FIG. 12 illustrates an example of a grouping with two groups in the system of FIG. 3.

An example of a grouping with the first group 101 of FIG. 8 and a second group 103 is shown in FIG. 12. Second group 103 comprises lights 44 to 47 of FIG. 3. Sensor device 27 is configured to transmit a command message to the group 103 when it detects someone near the front door of room 21. Lights 44 to 47 provide a similar service, as they are all lights and they all illuminate the area near the front door of room 21.

The fact that light 44 is part of both first group 101 and second group 103 creates an additional complexity. A relatively simple solution would be to determine the schedules for first group 101 and second group 103 independently and allocate the time periods from both schedules to light 44. However, more optimal allocations may be achieved by coordinating the schedules of both groups. Examples of this are shown in FIGS. 13 and 14.

Figure 13:
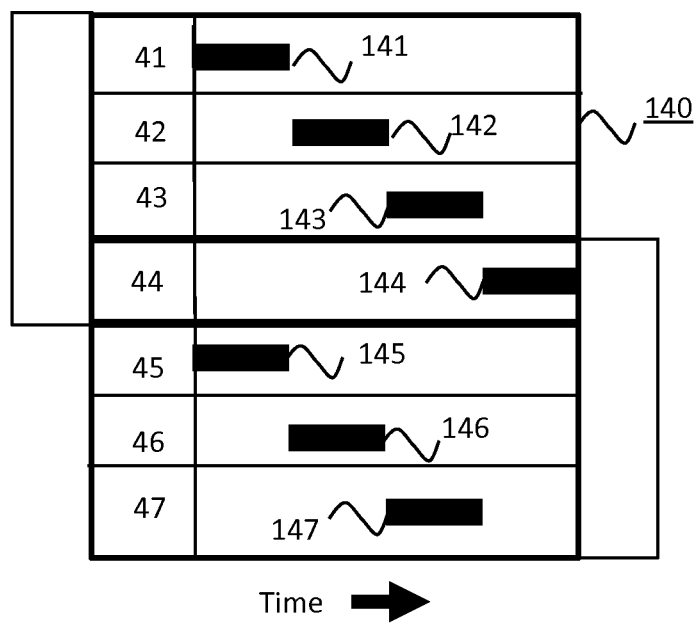
FIG. 13 depicts a first example of a schedule for the grouping of FIG. 12.

A first example of a schedule determined for first group 101 and second group 103 is depicted in FIG. 13. In schedule 140, each of the lights 41 to 44 of first group 101 is allocated a time period of equal duration: time period 141 is allocated to light 41, time period 142 is allocated to light 42, time period 143 is allocated to light 43 and time period 144 is allocated to light 44. Light 44 has been identified as further belonging to second group 103. In this example, each of the lights 44 to 47 of second group 103 is also allocated a time period of equal duration.

To achieve a more optimal allocation, the fact that light 44 has been allocated time period 144 in the schedule for group 101 is taken into account. Since the time period 144 is acceptable for second group 103, light 44 is allocated the same time period 144 in the schedule for second group 103. Next, the time periods 145 to 147 are allocated to lights 45 to 47, respectively. The schedule 140 is shown in FIG. 13 as a single schedule with time periods for multiple groups, but schedule 140 may be regarded as comprising two schedules: one for the first group 101 and one for the second group 103.

Figure 14:
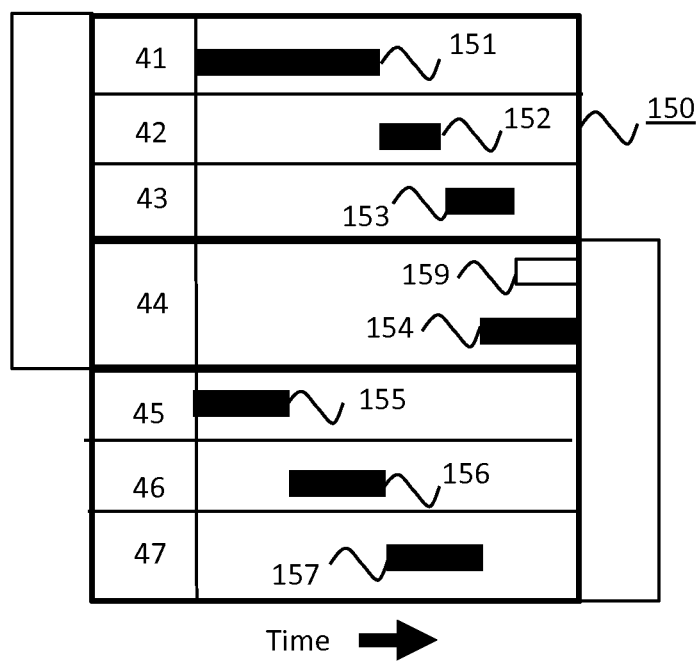
FIG. 14 depicts a second example of a schedule for the grouping of FIG. 12.

A second example of a schedule determined for first group 101 and second group 103 is depicted in FIG. 14. In schedule 150, with respect to first group 101, a longer time period 151 has been allocated to light 41 and shorter time periods have been allocated to lights 42 to 44. Time periods 152, 153 and 159 are allocated to lights 42 to 44, respectively, and all have the same duration in this example. Each of the lights 44 to 47 of second group 103 is allocated a time period of equal duration. The result is that the time period 159 allocated to light 44 with respect to first group 101 is not acceptable for second group 103, because it is not long enough. In order to achieve a more optimal allocation, a time period 154 which comprises time period 159, but is somewhat longer, is allocated to light 44 instead of time period 159. This accommodates both the requirements for first group 101 and the requirements for second group 103. Next, the time periods 155 to 157 are allocated to lights 45 to 47, respectively. The schedule 150 does not have any listening gaps, which is typically an important requirement.

Figure 15:
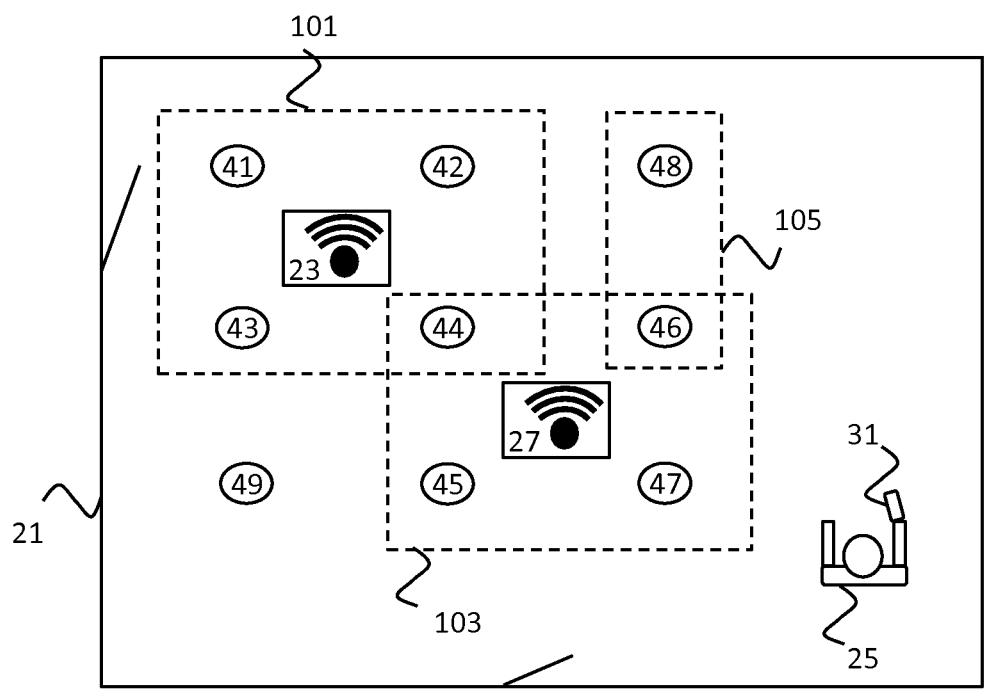
FIG. 15 illustrates an example of a grouping with three groups in the system of FIG. 3.

An example of a grouping with the first group 101 of FIG. 8, the second group 103 of FIG. 12 and a third group 105 is shown in FIG. 15. Third group 105 comprises lights 46 and 48 of FIG. 3. Person 25 uses mobile device 31 to control lights 46 and 48. In this example and in the previous grouping examples, the devices of the groups all provided a functional light service. In an alternative embodiment, a television that provides ambient lighting (e.g. Philips Ambilight TV) is used instead of light 46 and a speaker system is used instead of light 48. In this alternative embodiment, second group 103 would still comprise lights that all illuminate the area near the front door of room 21, but third group 105 would comprise devices with an audio reproduction function. Instead of being configured to provide a functional lighting service, the lights of the second group 103 might be configured to provide an entertainment lighting service.

The fact that light 46 is part of both second group 103 and third group 105 creates a second additional complexity. The most optimal allocation may be achieved by coordinating the schedules of all three groups. Examples of this are shown in FIGS. 16 to 18.

Figure 16:
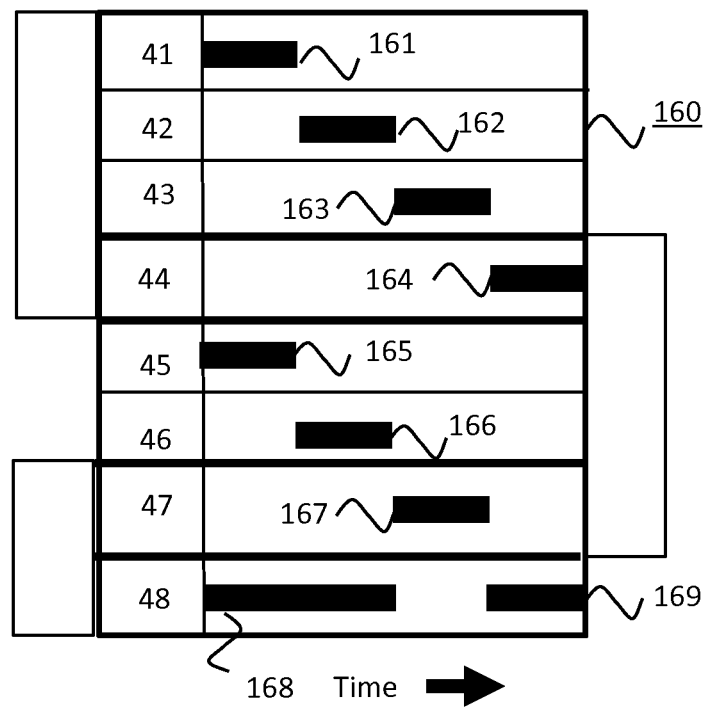
FIG. 16 depicts a first example of a schedule for the grouping of FIG. 15.

A first example of a schedule determined for first group 101, second group 103 and third group 105 is depicted in FIG. 16. In schedule 160, the time periods with regard to first group 101 and second group 103 are allocated as described in relation to FIG. 13. Time periods 161 to 167 correspond to time periods 141 to 147 of FIG. 13, respectively. The time periods with regard to third group 105 are determined last. Since the time period 167 is acceptable for third group 105 and as it is beneficial to allocate light 48 a longer time period than light 47 (e.g. because light 48 consumes less power), light 47 is allocated the same time period 167 in the schedule for third. Next, the remaining time, i.e. time periods 168 and 169, is allocated to light 48.

Figure 17:
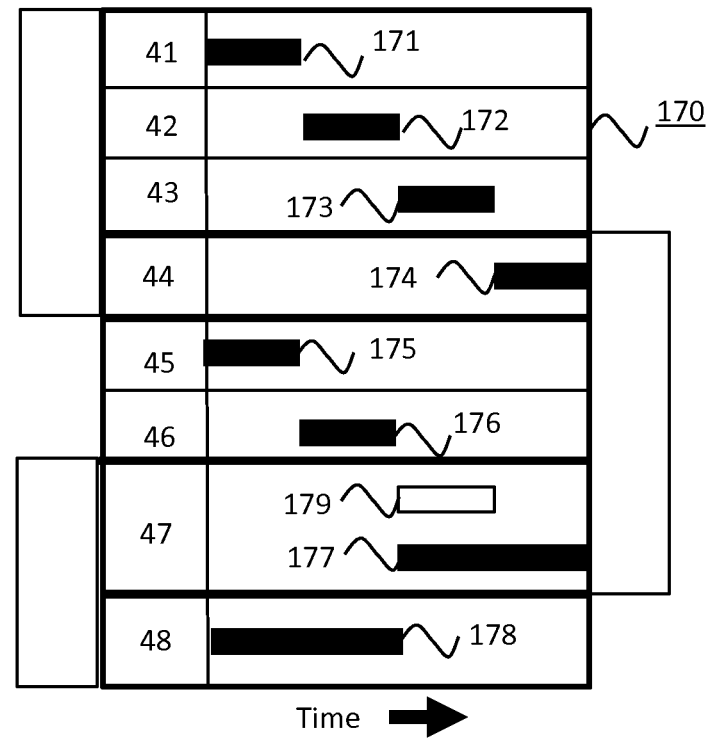
FIG. 17 depicts a second example of a schedule for the grouping of FIG. 15.
Figure 18:
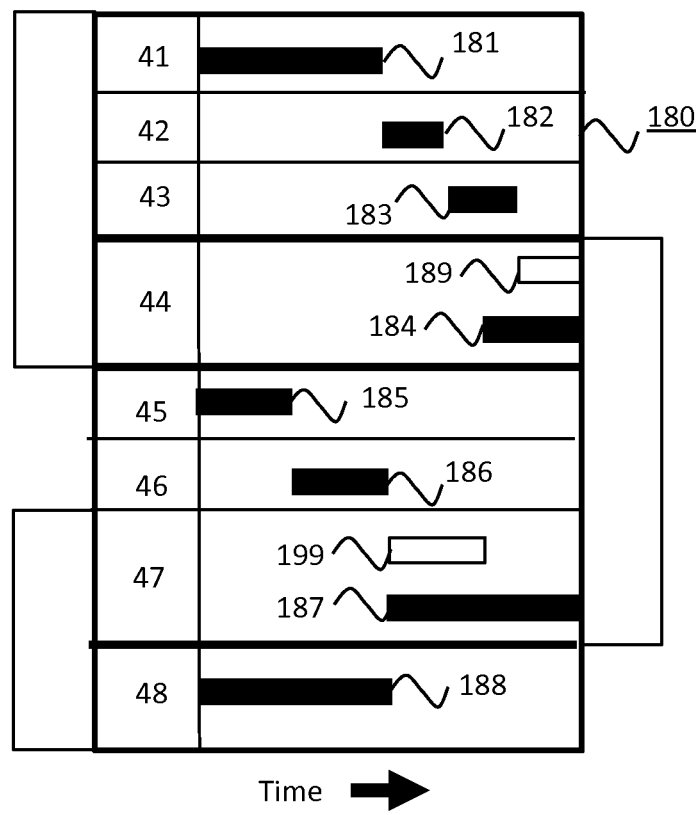
FIG. 18 depicts a third example of a schedule for the grouping of FIG. 15.

A second example of a schedule determined for first group 101, second group 103 and third group 105 is depicted in FIG. 17. In schedule 170, the time periods with regard to first group 101, time periods 171 to 174, are determined first and are the same as time periods 161 to 164, respectively, determined for the first group 101 in the schedule 160 shown in FIG. 16. Next, the time periods 177 and 178 are allocated to lights 47 and 48 of the third group 105, respectively, such that each of lights 47 and 48 is allocated an equal share.

Finally, the time periods with regard to second group 103 are determined. If there would have been no other groups/schedules to take into account, each light 44 to 47 would have been allocated an equal share. Time period 174, which was allocated to light 44 for first group 101, is acceptable for second group 103. Time period 179 might have been allocated to light 47 if time period 177 had not already been allocated to light 47 for third group 105. Time period 177 is longer than necessary for second group 103, but is acceptable for second group 103. The remaining time periods 175 and 176 are allocated to lights 45 and 46, respectively. Although there is overlap between time periods 174 and 177 in second group 103, this may still be considered the most optimal schedule overall, e.g. because it results in the most energy efficiency overall.

A third example of a schedule determined for first group 101, second group 103 and third group 105 is depicted in FIG. 18. In schedule 180, the time periods with regard to third group 105 are determined first. Time periods 187 and 188 are allocated to lights 47 and 48 of the third group 105, respectively, such that each of lights 47 and 48 is allocated an equal share. Next, the time periods with regard to second group 103 are determined. If there would have been no other groups/schedules to take into account, each light 44 to 47 would have been allocated an equal share. Time period 199 might have been allocated to light 47 if time period 187 had not already been allocated to light 47 for third group 105. Time period 187 is longer than necessary for second group 103, but is acceptable for second group 103. The remaining time periods 184, 185 and 186 are allocated to lights 44, 45 and 46, respectively.

Finally, the time periods with regard to first group 101 are determined. If there would have been no other groups/schedules to take into account, lights 44 to 47 would have been allocated time periods 121 to 124 of FIG. 10. Time period 189 might have been allocated to light 44 if time period 184 had not already been allocated to light 44 for second group 103. Time period 184 is longer than necessary for first group 101, but is acceptable for first group 101. The remaining time periods are allocated to lights 41 to 43 as described in relation to FIG. 10. Time periods 181 to 183 correspond to time periods 121 to 123 of FIG. 10. Although there is overlap between time periods 183 and 184 in first group 101 and time periods 184 and 187 in second group 103, this may still be considered the most optimal schedule overall, e.g. because it results in the most energy efficiency overall.

The group order in which time periods are determined for the groups may depend, for example, on when the group was formed. For example, if a new group is formed, a schedule may be determined for the new group while taking into account the schedules for the existing groups. Alternatively, a new schedule may be determined for all groups, including the new group. In this case, the group order may be arbitrary, for example. Alternatively, an optimization algorithm may be used to determine which of the different group orders produces the most energy efficient schedule, for example.

Figure 19:
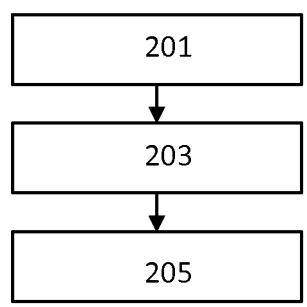
FIG. 19 is a flow diagram of a first embodiment of the method of the invention.

A first embodiment of the invention is shown in FIG. 19. A step 201 comprises determining a group of service-providing devices. The group comprises at least two service-providing devices capable of performing a similar or a same service. A step 203 comprises determining a schedule for the service-providing devices in the group. The schedule indicates for each service-providing device of the group in which time period the service-providing device is able to receive messages such that at least one device of the determined group of service-providing devices. A step 205 comprises transmitting the schedule to the service-providing devices.

Figure 20:
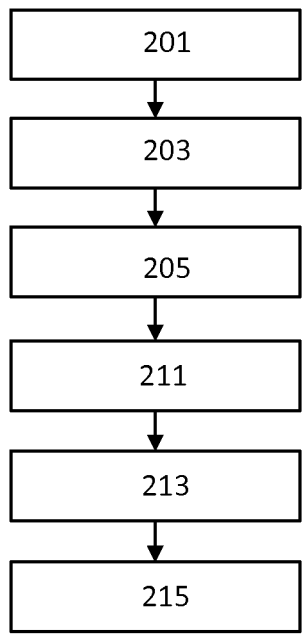
FIG. 20 is a flow diagram of a second embodiment of the method of the invention.

A second embodiment of the method of the invention is shown in FIG. 20. In this second embodiment, the method comprises the same steps 201, 203 and 205 as in the first embodiment shown in FIG. 19, but further comprises steps 211, 213 and 215. Step 211 comprises receiving a command message addressed to at least a first service-providing device of the group. The command message commands at least the first service-providing device to perform a specified service at a specified service level. Step 213 comprises determining a service level in dependence on the specified service level. Step 215 comprises causing a second service-providing device of the group to start performing a service similar to or the same as the specified service at the determined service level upon receipt of the command message.

Figure 21:
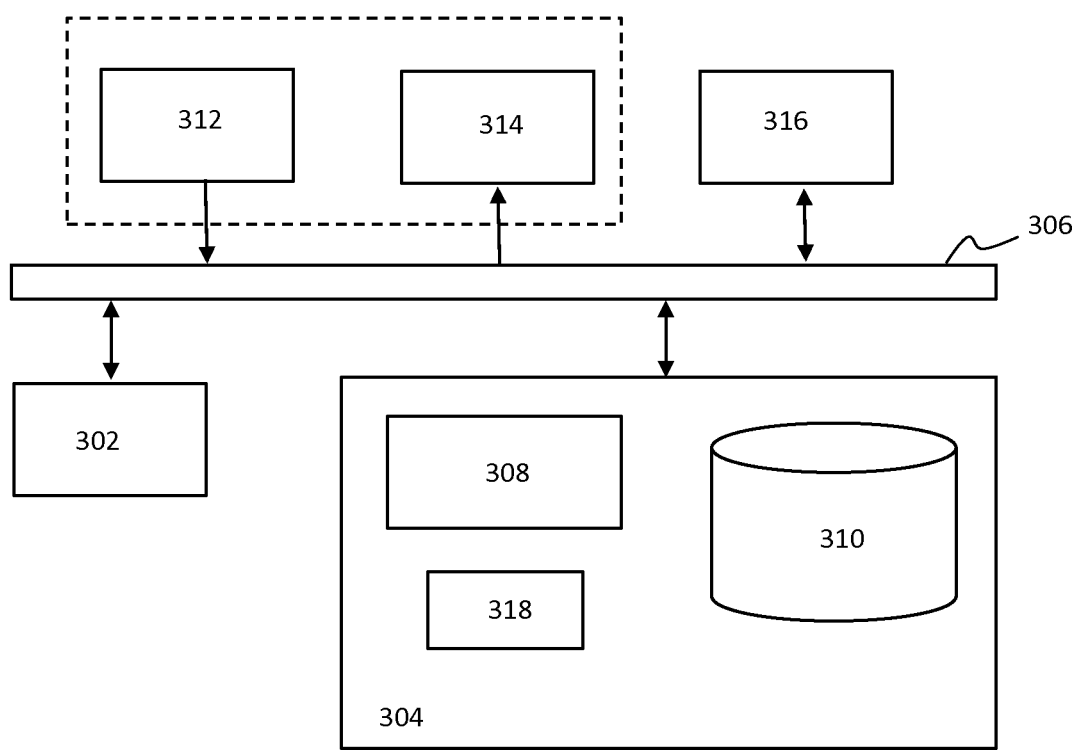
FIG. 21 is a block diagram of an exemplary data processing system for performing the method of the invention.

FIG. 21 depicts a block diagram illustrating an exemplary data processing system that may perform the method as described with reference to FIGS. 19 and 20.

As shown in FIG. 21, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 21 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 21, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 21) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed.

The invention claimed is:

1. A lighting device for enabling energy conservation, comprising:
   at least one transmitter; and
   at least one processor configured to:
      determine a group of service-providing devices, said group comprising at least two service-providing devices capable of performing a similar or a same lighting service,
      determine a schedule for said service-providing devices in said group, said schedule indicating for each service-providing device of said group in which time period said service-providing device is able to receive messages such that at least one device of the determined group of service-providing devices is able to receive messages, and
      use said at least one transmitter to transmit said schedule to said service-providing devices.

2. The lighting device as claimed in claim 1, wherein said at least one processor is configured to determine said group of service-providing devices by selecting said group of service-providing devices from a set of service-providing devices based on information identifying which services said service-providing devices of said set are capable of providing.

3. The lighting device as claimed in claim 1, wherein said at least one processor is configured to determine said group of service-providing devices by selecting said group of service-providing devices from a set of service-providing devices based on spatial locations of said service-providing devices of said set.

4. The lighting device as claimed in claim 1, wherein said at least one processor is configured to determine the durations of said time periods of said schedule based on at least one of: energy consumption of said service-providing devices, spatial locations of said service-providing devices, spatial service-provisioning areas of said service-providing devices, usage of said service-providing devices, time required by said service-providing devices to enter and/or leave a standby mode, and identifiers of services provided by said service-providing devices.

5. The lighting device as claimed in claim 1, further comprising a user interface, wherein said at least one processor is configured to use said user interface to provide said schedule to a user and allow said user to adapt said schedule.

6. The lighting device as claimed in claim 1, further comprising at least one receiver and wherein said at least one processor is configured to:
   use said at least one receiver to receive a command message addressed to at least a first service-providing device of said group, said command message commanding at least said first service-providing device to perform a specified service at a specified service level,
   determine a service level in dependence on said specified service level, and
   cause a second service-providing device of said group to start performing a service similar to or the same as said specified service at said determined service level upon receipt of said command message.

7. The lighting device as claimed in claim 6, wherein said at least one processor is configured to use said at least one transmitter to transmit said command message to said first service-providing device at a moment which depends on a start of said time period in which said first service-providing device is able to receive messages as specified in said schedule.

8. The lighting device as claimed in claim 6, wherein said at least one processor is configured to cause said second service-providing device to stop performing said service at a current service level at a moment which depends on a start of said time period in which said first service-providing device is able to receive messages as specified in said schedule.

9. The lighting device as claimed in claim 6, wherein said group further comprises at least a third service-providing device, said time period in which said third service-providing device is able to receive messages as specified in said schedule is sooner than a time period in which any other service-providing device of said group is able to receive messages as specified in said schedule, and said at least one processor is configured to:
   determine a further service level in dependence on said specified service level, and
   cause said second service-providing device to stop performing said service at said determined service level and start performing said service at said determined further service level at a moment which depends on a start of said time period in which said third service-providing device is able to receive messages as specified in said schedule.

10. The lighting device as claimed in claim 6, wherein said group further comprises at least a third service-providing device, said time period in which said first service-providing device is able to receive messages as specified in said schedule is later than a time period in which any other service-providing device of said group is able to receive messages as specified in said schedule, and said at least one processor is configured to
   cause said second service-providing device to stop performing said service at said determined service level at a moment which depends on a start of said time period in which said first service-providing device is able to receive messages as specified in said schedule.

11. The lighting device as claimed in claim 6, wherein said command message is addressed to only said first service-providing device and said at least one processor is configured to cause said second service-providing device to stop performing said service at a moment which depends on a start of said time period in which said first service-providing device is able to receive messages as specified in said schedule.

12. A lighting system comprising:
   said lighting device of claim 1; and
   a further lighting device, said further lighting device comprising at least one receiver and at least one processor configured to use said at least one receiver to receive said schedule from said lighting device, use said at least one receiver to receive a command message addressed to at least a first service-providing device of said group, said command message commanding at least said first service-providing device to perform a specified service at a specified service level, determine a service level in dependence on said specified service level, and cause a second service-providing device of said group to start performing a service similar to or the same as said specified service at said determined service level upon receipt of said command message.

13. A method for enabling energy conservation in a lighting device, comprising:

determining a group of service-providing devices, said group comprising at least two service-providing devices capable of performing a similar or a same lighting service; the method characterized in that it further comprises:

determining a schedule for said service-providing devices in said group, said schedule indicating for each service-providing device of said group in which time period said service-providing device is able to receive messages such that at least one device of the determined group of service-providing devices is able to receive messages; and transmitting said schedule to said service-providing devices.

\* \* \* \* \*